No. 699,510. Patented May 6, 1902.
J. E. FORFAR.
MUSIC TEACHING APPARATUS.
(Application filed Sept. 24, 1900.)
(No Model.) 2 Sheets—Sheet 1.

Witnesses
A. J. Colbourne.
J. W. Webster.

Inventor
J. E. Forfar
by Ridout & Maybee
Attys

No. 699,510. Patented May 6, 1902.
J. E. FORFAR.
MUSIC TEACHING APPARATUS.
(Application filed Sept. 24, 1900.)
(No Model.) 2 Sheets—Sheet 2.

Witnesses
J. J. Colbourne.
J. M. Webster.

Inventor
J. E. Forfar
by Ridout & Maybee
Attys

UNITED STATES PATENT OFFICE.

JAMES E. FORFAR, OF TORONTO, CANADA.

MUSIC-TEACHING APPARATUS.

SPECIFICATION forming part of Letters Patent No. 699,510, dated May 6, 1902.

Application filed September 24, 1900. Serial No. 30,977. (No model.)

*To all whom it may concern:*

Be it known that I, JAMES E. FORFAR, doctor of medicine, of the city of Toronto, in the county of York, Province of Ontario, Canada, have invented certain new and useful Improvements in Music-Teaching Apparatus, of which the following is a specification.

The object of my invention is to devise an apparatus which may be used in teaching music by kindergarten methods; and the essence of the system is a board upon which are painted the lines of the musical staff and upon which notes and musical signs may be detachably affixed by means of sharp-pointed pins projecting therefrom or in any other convenient manner. To the board are also connected devices for teaching the lines and spaces, staff-building, and time, all substantially as hereinafter more specifically described.

Figure 1:
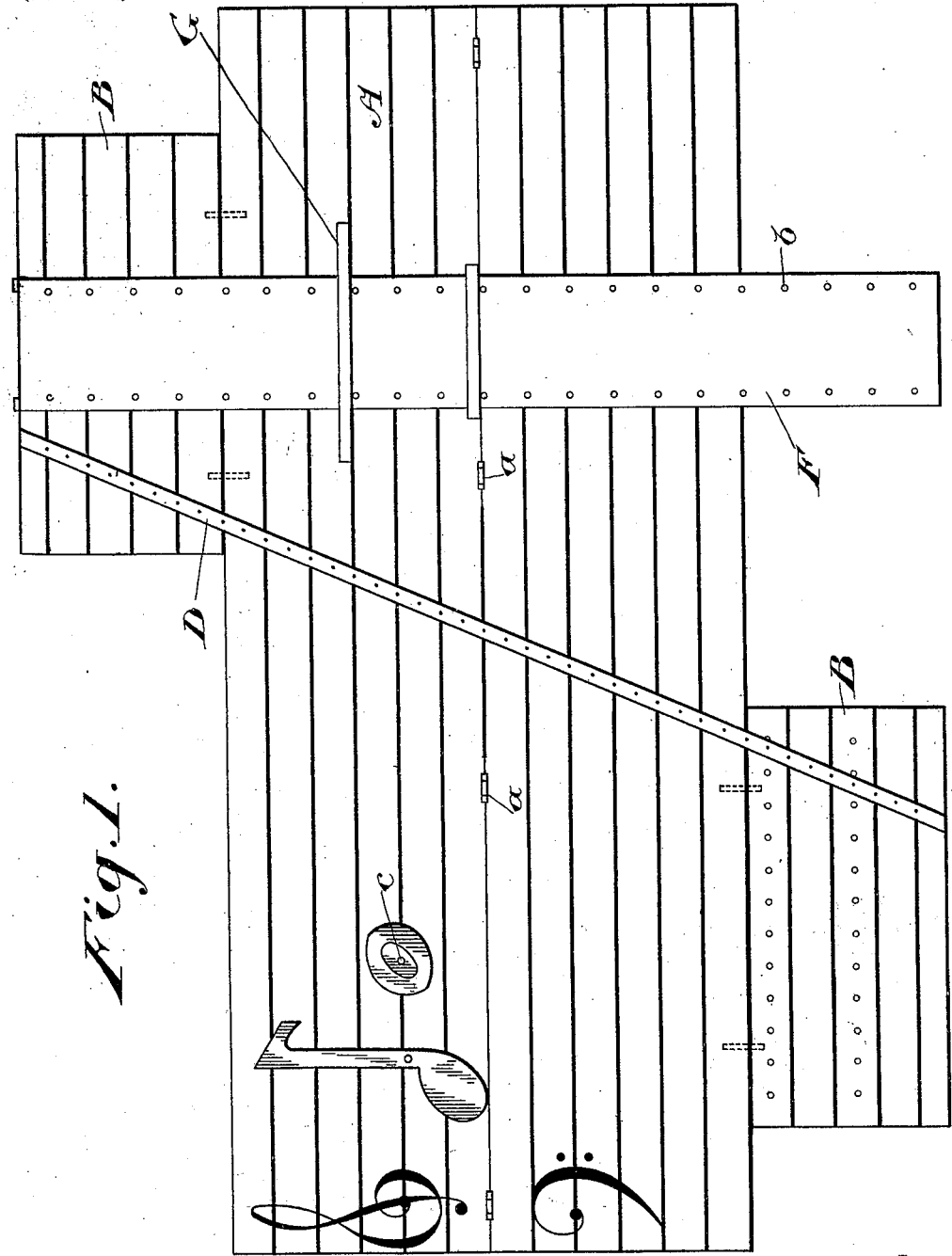
Figures 2, 3:
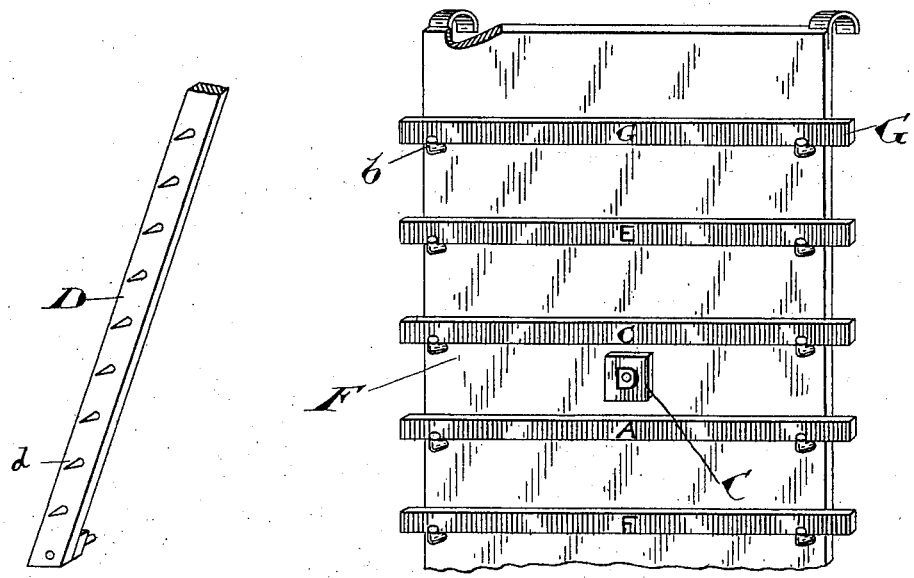
Figure 4:
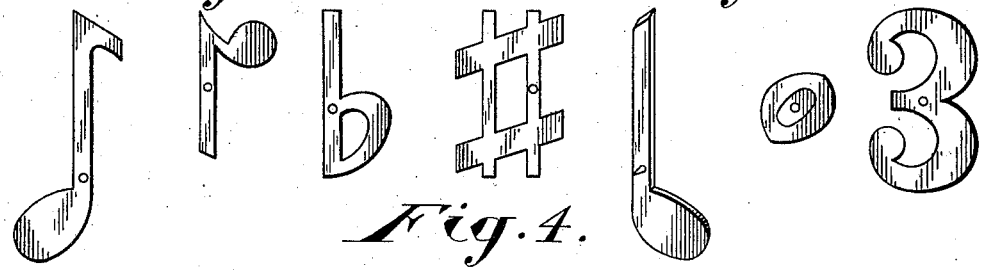
Figures 6, 7:
Figures 5, 8:
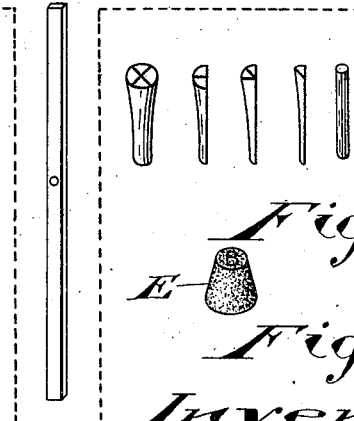

In the drawings, Figure 1 is an elevation of the board and teaching apparatus. Fig. 2 is a perspective detail of a portion of an attached diagonal strip with its pins. Fig. 3 is a perspective detail, partly broken away, showing staff-building attachment. Fig. 4 shows plan views of some of the notes and other musical signs used. Fig. 5 is a detail of one of the blocks used in teaching the lines and spaces. Fig. 6 is a perspective detailed view of the pegs used in teaching time. Fig. 7 is a detailed view of the characters used in teaching time and made attachable to the board in the same manner as the notes and musical signs. Fig. 8 is a perspective detail of one of the corks used in connection with the diagonal strip in teaching the lines and spaces.

In the drawings like letters of reference indicate corresponding parts in the different figures.

A is a board, preferably divided into two parts hinged together at *a* for convenience of transportation. On its surface are painted or otherwise displayed the lines of the bass and treble staffs. The clefs may be either painted upon the board or made detachable like the notes and other signs, as hereinafter described. The leger lines are preferably formed upon supplemental boards B, attachable by means of pins to the upper and lower edges of the board A or, if desired, hinged thereon. Upon the complete board thus formed may be placed musical notes and signs such as illustrated in Fig. 4, each character being provided with a spike or pin *c*, by means of which it may be affixed to the board.

As other musical characters in ordinary use will be represented, a complete musical selection may be formed upon the board with scale-signature, time-sign, notes, rests, pauses, and marks of expression, &c. Each mark of expression is provided with one or more pins projecting from its under surface, which may be pressed into the board to cause the characters to stay in the desired places.

For the purpose of teaching the lines and spaces a series of blocks C are used, each marked with the name of the given line or space and provided with the usual pin for attachment to the board. (See Fig. 5.) These blocks are placed in their proper positions by the children or after having been placed are removed by them as directed. As an addition to this means of teaching the lines and spaces I provide a diagonal strip D, which may be attached to the board by means of pins *d*, projecting from its under side, which are adapted to enter holes in the board, the strip being set diagonally across all the lines of the bass and treble staffs and the leger lines above and below. (See Fig. 2.) From the surface of this strip project a series of pins, one for each line and each space. Upon these pins may be placed corks E, such as shown in Fig. 8, each marked on one end with the name of the line or space. Like the blocks C, these corks may be used in teaching the lines and spaces by placing them in or removing them from their proper position opposite the given line or space. As a variation gum-drops or other articles attractive to the children may be placed upon the pins and the children instructed to remove those opposite certain given lines or spaces, the possession of the gum-drop being the reward of a successful choice.

To teach staff-building, I provide a frame or board F (see Figs. 1 and 3) with projecting pins *b*. This board is so arranged that it may be attached to the board A, so that a pin projects just below each line of the staff. Upon these pins are laid bars G to represent the line of the staff. The bar for the middle C is made short, as well as the other bars used for leger lines.

The pins *b* may be secured in the board A; but it is more convenient to use the attached board F.

To teach time, I provide the board with a series of equidistant holes, preferably in the spaces between some of the lower leger lines, as being most easily reached. Into these holes may be inserted pegs, such as shown in Fig. 6, representing the whole and the half, quarter, and eighth of a circle and also a dot which increases the length of the previous note by half. The children are taught to fill up each measure with a sufficient number of pegs and dots to give full measures according to the time indicated. As a variation the characters shown in Fig. 7 may be used in any position upon the staff in a similar manner.

To make the apparatus attractive to the eye and at the same time aid in teaching, I prefer to make the characters of different colors. For instance, sharps may be marked red, flats blue, rests green, time blue, and other characters of different colors.

The above is a bald description of the apparatus employed; but it is impossible in the limits of a specification to indicate thoroughly the method of using the same. Suffice it to say that at every step the kindergarten play methods are used and appropriate songs accompany as far as possible the different lessons.

By the use of such a graphic system of teaching the dry technical part of music is rendered so interesting as to be learned with great rapidity by the very youngest pupils, and learned not only rapidly but very thoroughly.

In elaborating the system various changes may be made in the details of the construction; but the above description will be found sufficiently full to set forth the principles of the invention.

What I claim as my invention is—

1. In music-teaching apparatus a board having the lines of the musical staff displayed thereon in combination with two supplemental boards detachably secured respectively to the lower left-hand edge and the upper right-hand edge of the main board and having leger lines above and below the staff displayed thereon, substantially as and for the purpose specified.

2. In music-teaching apparatus a board having the lines of the musical staff displayed thereon in combination with two supplemental boards attached respectively to the lower left-hand edge and the upper right-hand edge of the main board and having leger lines above and below the staff displayed thereon; and a detachable diagonal strip extending across the three boards and provided with projecting pins opposite any or all of the lines and spaces of the said boards, substantially as and for the purpose specified.

3. In music-teaching apparatus a board having the lines of the musical staff displayed thereon in combination with a detachable strip extending across the said board and provided with projecting pins opposite the lines and spaces of the said board, substantially as and for the purpose specified.

4. In music-teaching apparatus a board provided with a series of projecting pins arranged in pairs in combination with a number of bars suitably spaced to agree with the lines of the staff and which may be laid upon the pins to represent the long lines of a musical staff, and short bars to represent the leger lines of the staff, substantially as and for the purpose specified.

5. In music-teaching apparatus a board provided with a series of projecting pins arranged in pairs in combination with a number of bars suitably spaced to agree with the lines of the staff and which may be laid upon the pins to represent the long lines of a musical staff; and short bars to represent the leger lines of the staff, and a series of blocks marked with the names of the spaces and provided with projecting spikes or pins for attachment to the board between the said bars, substantially as and for the purpose specified.

Toronto, September 21, 1900.

JAMES E. FORFAR.

In presence of—
J. EDW. MAYBEE,
S. J. COLBOURNE.